(12) United States Patent
Yukio et al.

(10) Patent No.: US 6,830,455 B1
(45) Date of Patent: Dec. 14, 2004

(54) INSTRUMENT FOR CONTEMPLATION

(75) Inventors: Minegishi Yukio, Kanagawa (JP); Harada Yasuo, Kanagawa (JP); Matsuzaki Toshimichi, Yashio (JP)

(73) Assignee: Think Tanks Co., Ltd., Kanagawa (JP)

( * ) Notice: Subject to any disclaimer, the term of this patent is extended or adjusted under 35 U.S.C. 154(b) by 0 days.

(21) Appl. No.: 09/711,002

(22) Filed: Nov. 9, 2000

(30) Foreign Application Priority Data

Dec. 27, 1999 (JP) .......................................... 11-368966

(51) Int. Cl.[7] .............................................. G09B 5/00
(52) U.S. Cl. ..................................... 434/322; 434/107
(58) Field of Search ................................ 434/107, 109, 434/219, 322, 323, 350, 351, 352, 236

(56) References Cited

U.S. PATENT DOCUMENTS

| | | | | |
|---|---|---|---|---|
| 5,183,297 A | * | 2/1993 | Bodziak et al. ............... 283/67 |
| 5,854,893 A | * | 12/1998 | Ludwig et al. ............. 709/204 |
| 6,237,025 B1 | * | 5/2001 | Ludwig et al. ............. 709/204 |
| 6,583,806 B2 | * | 6/2003 | Ludwig et al. .......... 348/14.08 |
| 6,608,636 B1 | * | 8/2003 | Roseman ..................... 345/753 |
| 6,671,693 B1 | * | 12/2003 | Marpe et al. ................ 707/102 |

OTHER PUBLICATIONS

Microsoft® Excel 97 SR-1, Jul. 11, 1997, Copyright © 1985-1997 Microsoft Corporation, Service Release 1, including instruction manual both on-line and in paper form.*

Microsoft® Excel 97 file SOLVSAMP.xls, Jul. 11, 1997, Copyright © 1985-1997 Microsoft Corporation.*

* cited by examiner

Primary Examiner—Kurt Fernstrom
(74) Attorney, Agent, or Firm—Osha & May L.L.P.

(57) ABSTRACT

The tool for contemplation comprises a paper on which a main unit and a sub unit that surrounds the main unit are printed. The main unit includes a subject display cell that displays a subject and a plurality of thought results display cells that display a plurality of thought results found from the subject. Each sub unit includes a new subject display cell that displays each thought result as a new subject, and a plurality of new thought results display cells that surrounds the new subject display cell and that display a plurality of thought results found from the new subject. Thereby, the tool for contemplation enables readily seeing and utilizing a plurality of thought results found from a subject.

20 Claims, 11 Drawing Sheets

Fig.1

| 2-2 | 2-3 | 2-4 | 3-2 | 3-3 | 3-4 | 4-2 | 4-3 | 4-4 |
|---|---|---|---|---|---|---|---|---|
| 2-1 | 2-0 | 2-5 | 3-1 | 3-0 | 3-5 | 4-1 | 4-0 | 4-5 |
| 2-8 | 2-7 | 2-6 | 3-8 | 3-7 | 3-6 | 4-8 | 4-7 | 4-6 |
| 1-2 | 1-3 | 1-4 | 2 | 3 | 4 | 5-2 | 5-3 | 5-4 |
| 1-1 | 1-0 | 1-5 | 1 | 0 | 5 | 5-1 | 5-0 | 5-5 |
| 1-8 | 1-7 | 1-6 | 8 | 7 | 6 | 5-8 | 5-7 | 5-6 |
| 8-2 | 8-3 | 8-4 | 7-2 | 7-3 | 7-4 | 6-2 | 6-3 | 6-4 |
| 8-1 | 8-0 | 8-5 | 7-1 | 7-0 | 7-5 | 6-1 | 6-0 | 6-5 |
| 8-8 | 8-7 | 8-6 | 7-8 | 7-7 | 7-6 | 6-8 | 6-7 | 6-6 |

Fig. 13
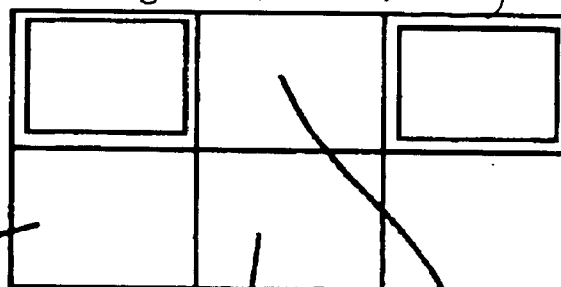
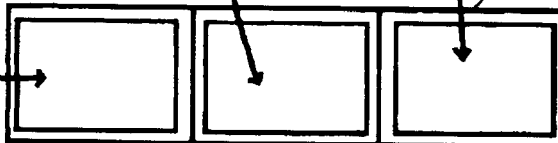
Fig. 14
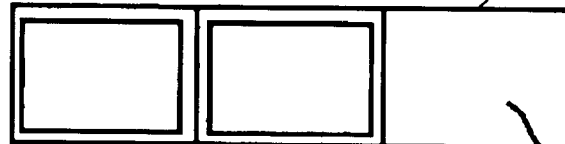
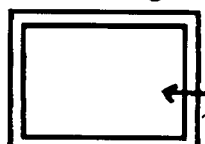

INSTRUMENT FOR CONTEMPLATION

BACKGROUND OF THE INVENTION

1. Field of the Invention

The present invention relates to an instrument for contemplation used for, when thinking of a variety of subjects, clarifying and arranging the process thereof.

2. Description of the Related Arts

To enhance the objectivity of management analysis of enterprises or to evaluate a variety of reform measures, managers collect information by using various methods. In addition, the persons concerned are gathered to hold meetings for measures and to exchange their opinions. Further, to effectively advance the meetings to reach the best possible conclusions, well-known techniques for meetings such as a brainstorming are employed. Moreover, Japanese Utility Model Publication No. 6-28294 has taught a method of thinking, which uses, nine cells deposited like a matrix, thereby to enable individually arranging the thought results that are found through thinking of a subject.

According to the method, a subject is written at the central cell of the nine cells while the thought results found by thinking of the subject are written in the eight cells surrounding the central cell, respectively. For example, when thinking of the subject "to double the turnover in the next term," the thought results such as "to expand the floor space of the shop" and "to increase the sort of loss leaders" are filled in the eight cells. Further, the thought result "to expand the floor space of the shop" is thought as a new subject to find means for embodying this subject. In this case, the nine cells are used similar to the above. In this way, the cells are utilized to visually arrange the specific means for embodying a large subject, thus to acquire a best conclusion.

In accordance with the above-mentioned scheme, eight, specific means are found with respect to a subject and further for each of the means are found other eight specific means, whereby nine by nine, that is to say, 81 ideas are listed. The managers or the like are required to arrange, check, select, and implement an idea or ideas. For this reason, it is expected that development of means for arranging and displaying the ideas in such a fashion that the ideas are easy to handle and use.

Further, employing the above method in a meeting that is attended by a plurality of persons can provide much better effects. In addition, when many means are listed as the result of thinking of a subject by a plurality of persons, it takes much time to arrange and evaluate them, whereby the meeting is dragged on and the analysis and use of the thought results found in the meeting are delayed.

SUMMARY OF THE INVENTION

It is therefore the object of the present invention to provide a instrument for contemplation that is capable of solving the above problem.

In accordance with an aspect of the present invention, there is provided an instrument for contemplation comprising a medium capable of displaying a character; a main unit that is provided on the medium, the main unit including a subject displaying cell that displays a subject, and a plurality of thought results displaying cells that are positioned in visual connection with the main unit and that display a plurality of thought results found from the subject; and a sub unit that is provided on the medium in visual connection with the main unit, the sub unit including a new subject displaying cell that displays one of the thought results as a new subject, and a plurality of new thought results displaying cells that are positioned in visual connection with the new subject displaying cell and that display a plurality of new thought results found from the new subject.

It is desirable that the medium includes a paper that is capable of being printed the main unit and the sub unit, and the instrument for contemplation further comprises a bending portion used for bending the paper at the boundary between the main unit and the sub unit, and a cutting portion used for cutting a part of the paper at the boundary between a sub unit and another sub unit adjacent thereto.

It is also desirable that the back of the paper is printed a supplementary cell for one of a thought result displaying cell in the main unit and a new thought result displaying cell in the sub unit.

In accordance with another aspect of the present invention, there is provided an instrument for contemplation comprising: a medium capable of displaying a character; a subject displaying cell that is provided on the medium, the subject displaying cell displaying a subject; a thought unit that is provided on the medium, the thought unit including a plurality of thought result displaying cells that display a plurality of thought results found from the subject; and a plurality of selecting units that are provided on the medium, the plurality of selecting units displaying a predetermined number of thought results selected among the thought results displayed in the thought unit, wherein each selecting unit includes an upper selecting unit that displays the thought results selected among the thought results displayed in the thought unit, and a lower selecting unit that displays a plurality of thought results selected among the thought results displayed in the upper selecting unit.

It is desirable that the thought unit is divided into a plurality of sub thought units that display a plurality of thought results, and the number of the sub thought units and the number of the selecting units are decided in such a fashion that the former number and the latter number are added to each other to be equivalent to the number of the participants for a meeting.

In accordance with further another aspect of the present invention, there is provided an instrument for contemplation comprising: a medium capable of displaying a character; a thought unit that is provided on the medium, the thought unit displaying a plurality of thought results found from a subject; a rank sorting unit that is provided on the medium, the ranking sort unit displaying the plurality of thought result, the plurality of thought results being ranked according to a given criterion and being sorted according to the ranks thereof; a ranking unit that is provided on the medium, the ranking unit displaying the plurality of thought results displayed on the rank sorting unit, the plurality of thought results being ranked according to the criterion and sorted from the upper to the lower; and a contents sorting unit that is provided on the medium, the contents sorting unit displaying the plurality of thought results that have been ranked, the plurality of thought results being sorted by contents, wherein the rank sorting unit includes a plurality of cells that display the plurality of thought results and are given the evaluation marks corresponding to the ranks thereof, and the contents sorting unit includes a totaling cell that displays the plurality of thought results that are given the evaluation marks prepared by the participants in such a fashion that the plurality of thought results are sorted by contents, and that displays the total of the evaluation marks corresponding to a plurality of thought results sorted in the same classification.

In accordance with still another aspect of the present invention, there is provided an instrument for contemplation using a computer, the computer being used by one of a plurality of conference participants, the instrument for contemplation comprising: a subject displaying cell that is shown on the display of the computer, the subject displaying cell displaying a subject; a thought unit that is shown on the display of the computer, the thought unit including a plurality of thought result displaying cells that display a plurality of thought results found from the subject; and a plurality of selecting units that are shown on the display of the computer, the plurality of selecting units displaying a predetermined number of thought results selected among the thought results displayed in the thought unit, each selecting unit including an upper selecting unit that displays the thought results selected among the thought results displayed in the thought unit, and a lower selecting unit that displays a plurality of thought results selected among the thought results displayed in the upper selecting unit, wherein the units are shown on the display of the computer used by the participant in a predetermined order.

BRIEF EXPLANATION OF THE DRAWINGS

FIG. 11 shows another image corresponding to the thought unit;

FIG. 12 shows images corresponding to the thought unit and the selecting unit;

FIG. 13 shows images corresponding to the selecting units;

FIG. 14 shows images corresponding to the selecting units; and

DESCRIPTION OF THE PREFERRED EMBODIMENTS

Hereinafter, the preferred embodiments of the present invention will be described with reference to the accompanied drawings.

<First Embodiment>

Figure 1:
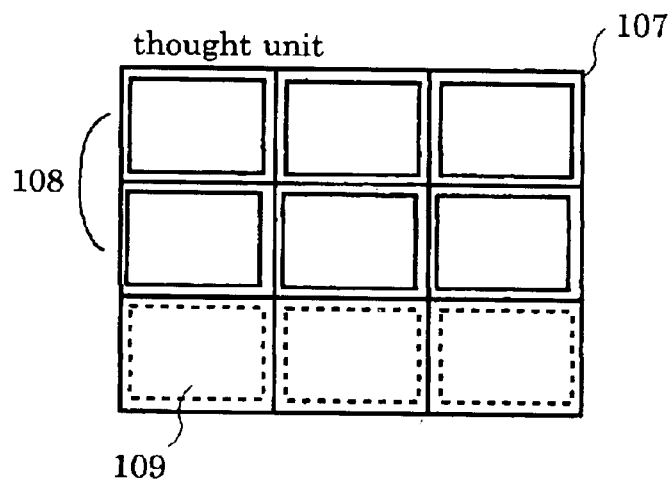
FIG. 1 schematically shows the instrument for contemplation of the first embodiment.
Figure 1:
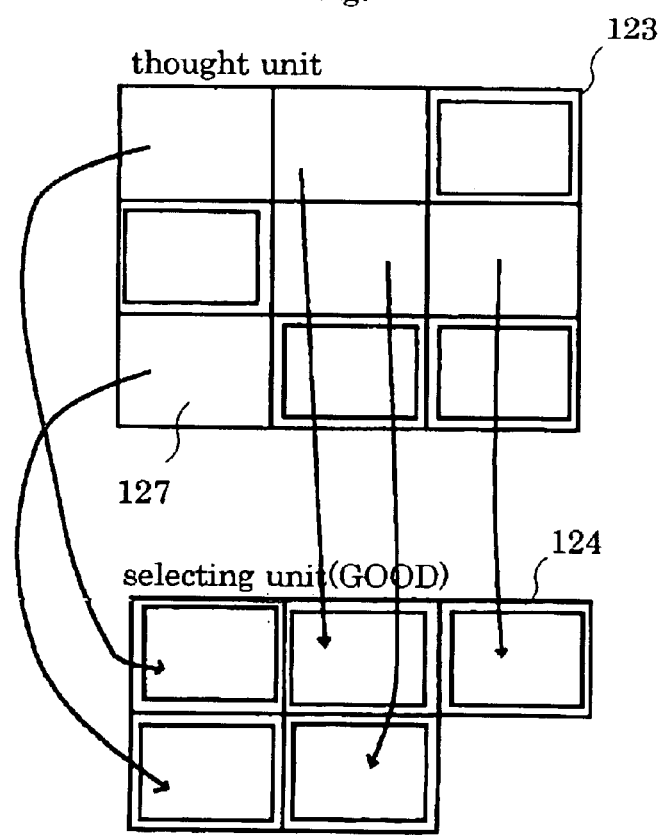

FIG. 1 schematically shows the instrument for contemplation of the first embodiment. The instrument for contemplation shown in the figure is a paper (medium) 1 on which a main unit 2 and a plurality of sub units 3 are printed, each unit including nine cells placed like a matrix of three by three.

The instrument for contemplation is used for showing a problem to be solved as a subject, and sorting or arranging the thoughts or ideas by randomly showing the measures. In the example depicted in the figure, since the cells explained above are printed on the paper 1 having a size suitable to print those cells, the instrument for contemplation is used by filling in using a pencil or pen. Further, in the above case, the medium is a paper capable of showing characters; however, to show the cells, the display of a word processor or computer is available as the medium, for example.

The main unit 2 in the figure incorporates, for example, nine cells arranged like a matrix of three rows and three columns, which is similar to the conventional art. In the subject display cell 5 (the cell referred to as the cell number 0) laid at the center of those cells is shown a subject that be contemplated. The eight cells (the cells referred to as the cell number 1-8) are so positioned as to surround the central cell. These eight cells of the cell number 1-8 serve as the thought result display cells 6 that show the thought results found by thinking of the subject. Hereinafter, the cell that shows the subject is referred to as the subject cell and the cell that shows the thought result is referred to as the thought cell. That is to say, at the center of the main unit 2 is laid the subject cell 5 while around the subject cell 5 are laid the eight thought cells 6.

The composition of the main unit 2 itself is well-known as described in the description of the related art. The main unit 2 is used as following.

Once a subject is given, first the subject is shown in the subject cell 5. Next, based upon the subject, for example, several measures to solve the subject are contemplated to be displayed in the thought cells 6 that surrounding the subject cell 5. In the case of the main unit 2 including nine cells, it is possible to show up to eight thought results. The relationship between the subject and the thought results has no limitation. In other words, as the thought results, a variety of keywords found by associating the subject may be filled in as well as the measures to solve the subject. The number of the thought cells 6 surrounding the subject cell 5 is arbitrary. The thought cells 6 are not required to physically surround the subject cell 5 completely.

FIG. 2 is a explanatory figure showing an improvement of the main unit. In the figure, the subject cell is hatched but the thought cells are not hatched to distinguish these subject and thought cells from each other. For example, in FIG. 2(a), the main unit incorporates a matrix of three rows and two columns. In FIG. 2(b), the main unit incorporates a matrix of two rows and two columns. In these cases, the thought cells 61 or 62 are not required to be so positioned as to surround the subject cells 51 or 52, respectively.

Figure 2D:
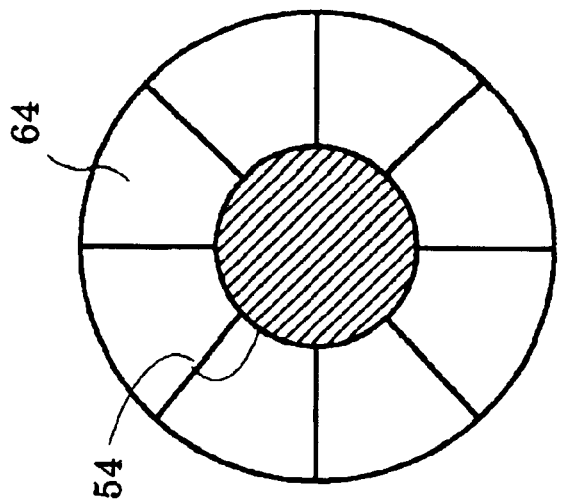
FIGS. 2(a), (b), (c), (d), and (e) are an explanatory diagrams showing an improved main unit.
Figure 2E:
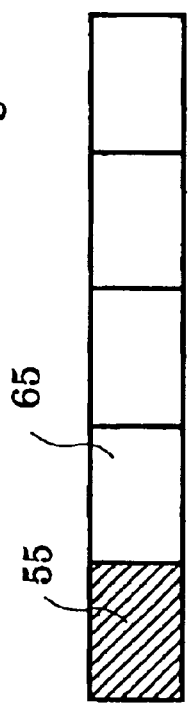
Figure 2C:
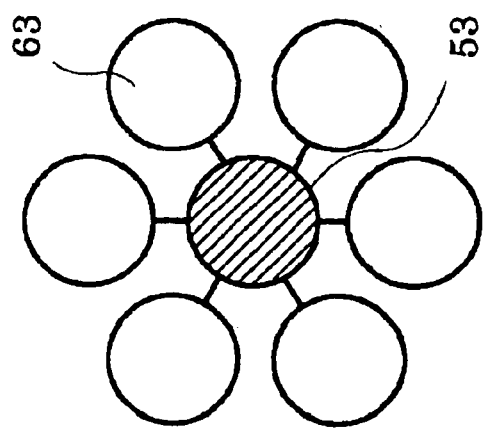
Figure 2A:
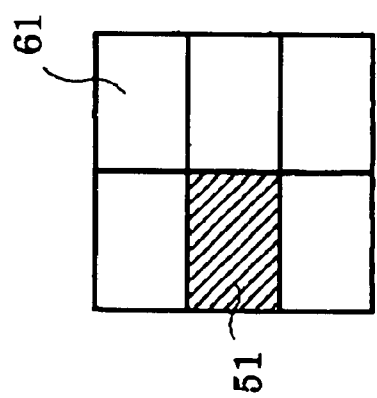
Figure 2B:
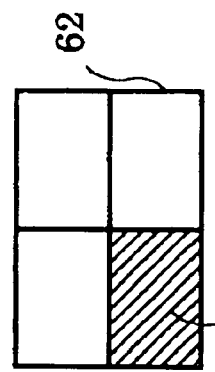

As shown in FIG. 2(c), the subject cell 53 and the thought cells 63 can be represented as circular cells. In FIG. 2(d), the thought cells 64 surrounding the subject cell 54 are fan-shaped to be like a circle graph. In this way, the main unit as a whole may not always include cells placed like a matrix. In FIG. 2(e), the subject cell 55 is positioned at the left end while the thought cells 65 are positioned at the right side thereof. As described above, the thought results are so positioned as to be visually connected with the subject.

The cell may not be surrounded by a solid line. For example, to clearly distinguish the parts in which the subject and the thought results are filled from the other parts, the former parts may be partitioned by drawing a pattern or separated by coloring. The composition of the unit explained above is available for the sub unit as well as the main unit, and is available for the relationship between the main unit and the sub unit. That is to say, the main unit and sub unit are so deposited as to be visually connected with each other on the paper shown in FIG. 1. Further, it is available for all the embodiments that will be described below.

Next, a method of using the sub unit 3 shown in FIG. 1 will be described. Once, for example, eight measures to solve a subject are found to be filled in the eight thought cells 6 in the main unit 2 and the same process advances regarding as a new subject one of the thought results shown in the thought cells 6, it is possible to study a more specific measure to solve the original subject. In this case, the work similar to the above can be done by preparing another paper on which the cells similar to those of the main unit 2 are printed; however, for avoidance of inconvenience, the instrument for contemplation shown in FIG. 1 includes eight sub units 3 that are so positioned as to surround the main unit 2.

In FIG. 1, each sub unit 3 incorporates a new subject display cell 15 and a plurality of new thought result display cells 16, wherein the new subject display cell 15 displays as a new subject one of the thought results laid in the main unit 2 while the new thought result display cells 16 are so arranged as to be visually associated with the new subject display cell 15, each displaying one of the new thought results concerning the new subject. Basically, the composition of the sub unit 3 is the same as that of the main unit 2. The sub units 3 each may have a composition different from that of the main unit 2 to distinguish those units from the main unit 3 and may have one of various shapes shown in FIG. 2. After the main unit 2 displays the original subject and the thought results, the sub units 3 are used in thinking of those results as new subjects.

In FIG. 1, into the subject cell of the cell number 2-0 in the sub unit 3 located at the upper right side of the main unit 2 is copied the thought result in the thought cell of the cell number 2 in the main unit 2. The measures to solve this subject are then filled in the thought cells of the cell number 2-1–2-8 surrounding the subject cell. The same works are carried out with respect to the other sub units 3.

Such a structure enables clarifying the relationships between the original subject and the new subjects on the paper and displaying the process of thinking as a whole. In the example of FIG. 1, each sub unit 3 can display new eight thought results with respect to one of the new eight subjects, which are capable of being shown with the main unit 2.

Figure 3C:
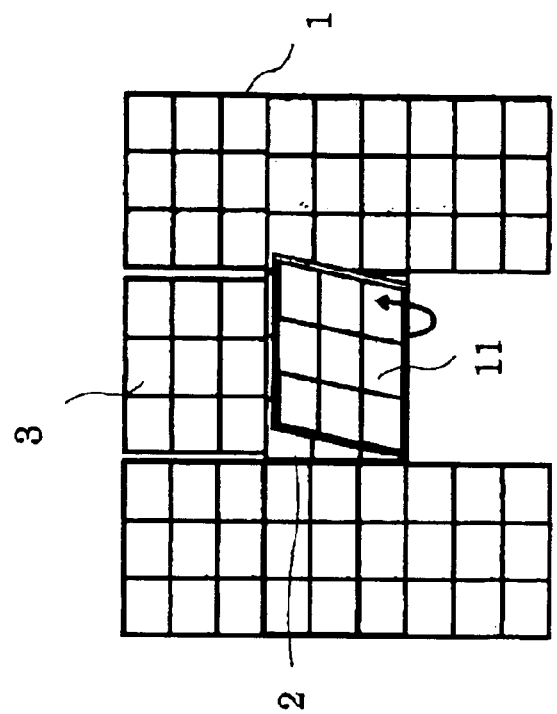
FIG. 3(c) is a top view showing another method of using the instrument for contemplation in FIG. 1.
Figure 3A:
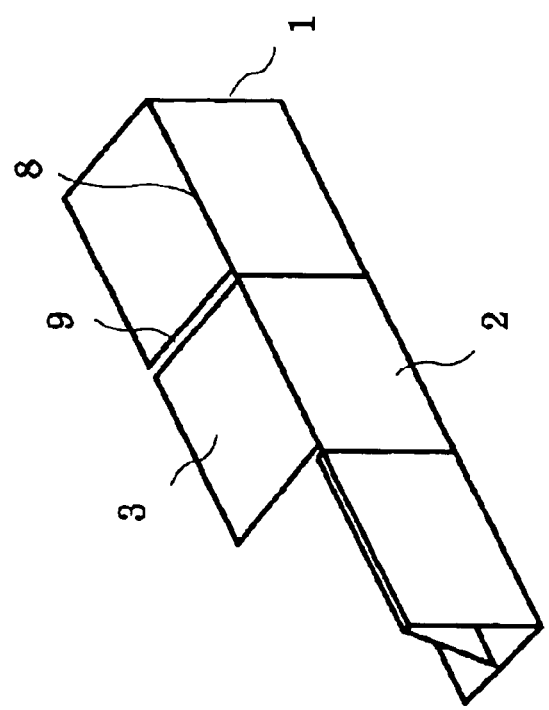
FIGS. 3(a) and (b) are perspective views of the process that the instrument for contemplation of the first embodiment is bent for use.

FIGS. 3(a) and (b) are perspective views showing the process in which the instrument for contemplation of FIG. 1 is folded for use, and FIG. 3(c) is a top view showing another method of using the instrument for contemplation of FIG. 1.

The instrument for contemplation described above is thought to be used to carry it, take it out of a pocket to write down new ideas when they arise, and study surveying the whole. In such a situation, it is not convenient to carry the paper shown in FIG. 1 with it opened.

Figure 3B:
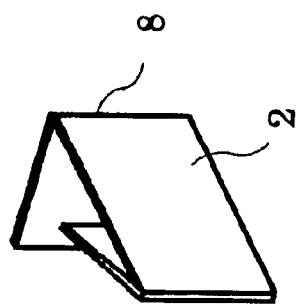

Therefore, in the example shown in FIG. 1, the paper 1 is bent at the fold lines 8 that are printed at boundary between the main unit 2 and each sub unit 3 and at the boundary between the sub units adjacent to each other. The cut line 9 serves to facilitate folding the paper from the state of FIG. 3(a) to that of FIG. 3(b). This enables keeping it in the pocket or the like of cloths, taking it out thereof according to necessity, referring to the main unit 2 or an arbitrary sub unit 3 for each unit, and studying the contents thereof.

Next, the example of FIG. 3(c) will be explained. At the boundary between the main unit 2 and the sub unit 3 is provided a bending portion in an arbitrary form to bend the paper. In addition to really printing the line, it is possible to provide a fold in the paper in advance. Further, at the boundary of one of the sub units may be provided a cutting portion in an arbitrary form to deeply cut a part of the paper. It is also possible to cut in advance as well as to print the line. Furthermore, the place of cutting for bending and folding is not limited to the place of the above example, wherein other places are available in lieu of the above place.

For example, it is assumed that the thought result in the cell of the cell number 1-0 shown in FIG. 1 is regarded as a new subject and various thought results are filled in the cells of the cell number 1-1–1-8 that surround the cell of the cell number 1-0. Studying the thought results again may cause a request of substituting a new thought result for the thought result that has been filled in the cell of the cell number 1-6. In this case, if the latter thought result is deleted from the cell o the cell number 1-0 and the former thought result is filled therein, the paper may become too deteriorated to see.

Therefore, in the example shown in FIG. 3(c), on the back of the paper 1 are printed supplementary cells 11. The supplementary cells 11 for the result thought display cells 6 of a sub unit 3 are desirably printed in such a fashion that these cells 11 are positioned adjacent to those cells 6 when the paper is bent as shown in FIG. 3(c). A supplementary cell 11 or supplementary cells 11 may be provided for the main unit 2 and may be provided for all the sub units 3. This enables carrying the paper 1, sometimes referring to its contents, studying again, selecting, and arranging and listing better measures to solve the subject.

<Second Embodiment>

Since the instrument for contemplation in the first embodiment is a printed paper, the means for filling in the subject and the thought results in the cells thereof is a pencil or a pen. Meanwhile, to jot down or contact a person by memorandum, a piece of paper to which such an adhesive that is easy to paste and peel is applied has been widely used. Pieces of paper whose number is the same as that of the above cells may be provided to fill in and paste a subject and thought results. Hereinafter, the piece of paper to which the adhesive that is easy to paste and peel is applied is referred to as a pasting tag. In the second embodiment, the instrument for contemplation is provided that enables holding efficient meetings by using the paste tag.

Figure 4:
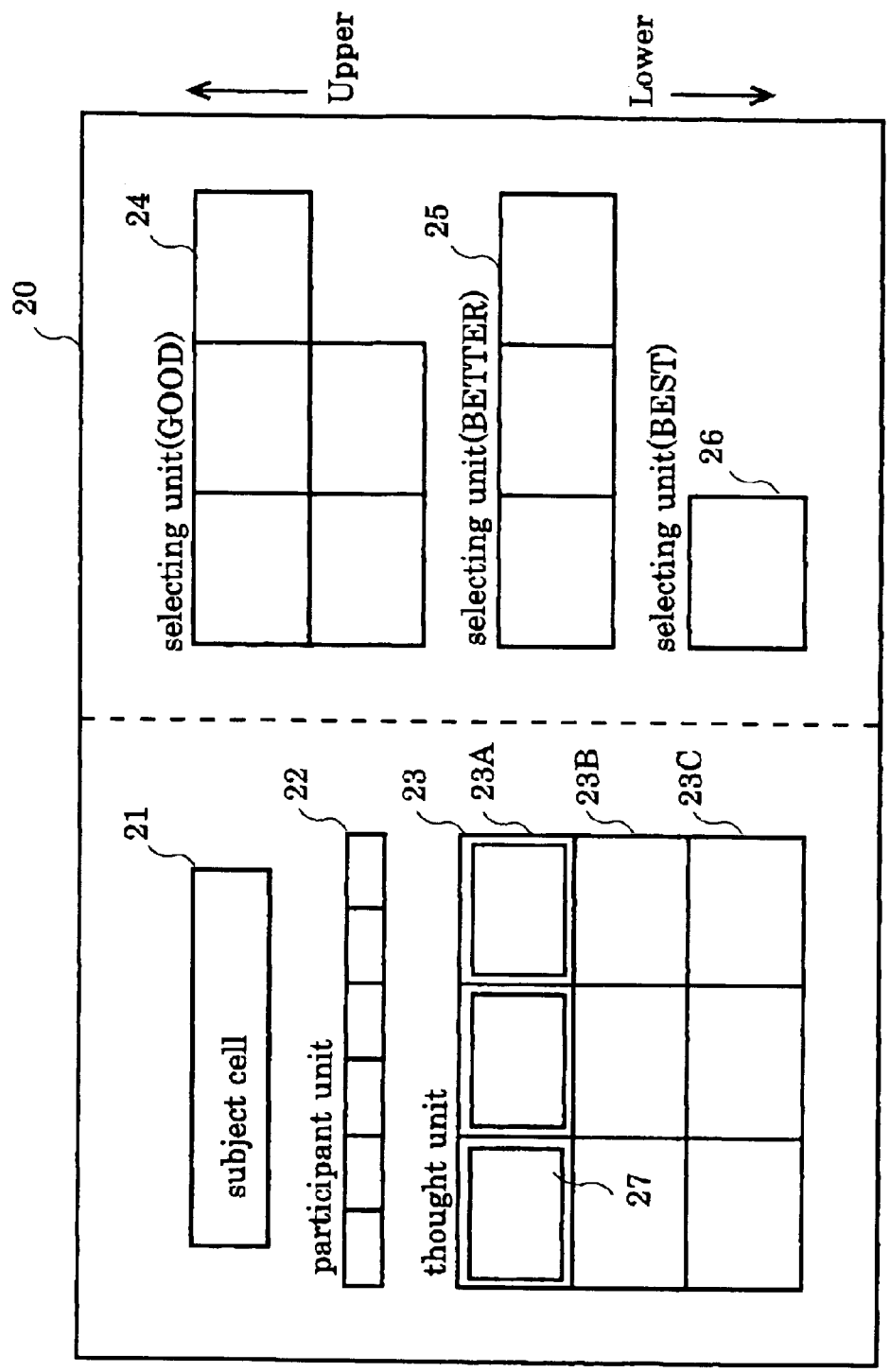
FIG. 4 schematically shows the instrument for contemplation of the second embodiment.

FIG. 4 is a schematic diagram showing the instrument for contemplation of the second embodiment. The instrument for contemplation is a paper 20 on which several units are printed similar to the first embodiment. As shown in the figure, in the left area of the paper, at the upper of the paper is printed a subject cell 21. At the center thereof is deposited a participant unit 22 that displays the names of the participants of the meeting. At the lower thereof is positioned a thought unit 23 in which a plurality of thought cells are arranged like a matrix of three rows and three columns.

Meanwhile, in the right area of the paper, three selecting units 24, 25, and 26 are deposited from upper to lower by turns. The selecting unit 24 is used to select five ones among the nine thought results displayed in the thought unit 23 and to display the selected ones. The selecting unit 25 is used to select three ones among the five thought results displayed in the selecting unit 24 and to display the selected ones. The selecting unit 26 is used to select one among the three thought results displayed in the selecting unit 25 and to display the selected one.

The number of thought results displayed in the thought unit 23 is arbitrary. The numbers of thought results displayed in the selecting units 24, 25, and 26 are also arbitrary. However, since the thought results are screened in the direction from the thought unit 23 to the selecting unit 26 via the selecting unit 24, the number of thought results closer to the selecting unit 26 is required to be smaller. In the figure, the thought unit 23 has nine thought cells to enable for participants to fill in nine thought results, and specifically has three sub thought units 23A, 23B, and 23C each including three thought cells to permit three participants to readily fill in three thought results, which will be described in detail.

The instrument for contemplation is used as following. First, the instruments for contemplation, which are designed similar to each other, are distributed among all the participants in a meeting. For example, assuming that the number of the participants in the meeting is six, six instruments for contemplation as shown in FIG. 4 are prepared to be distributed to the participants, respectively. Each participant fills the subject of the meeting in the subject cell 21 and fills his/her name in the participant unit 22. For example, a sentence or phrase like "to double our company's turnover in the next term" is written as the subject. Next, the time of thinking for three minutes is given for all the participants, and the participants fill their three thought results in their three pasting tags 27 to arrange and paste their pasting tags 27 in the first sub thought unit 23A. The pasting tags 27 are roughly the same as the thought cells in the thought unit 23 in size, as shown in the figure. Next, the participants hand in their instruments for contemplation to their left-hand participants, for example.

The time of thinking for three minutes and thirty seconds is given at this time, wherein each participant fills three new thought results in other three pasting tags 27, looking over the three thought results displayed in the first sub thought unit 23A of the instrument for contemplation that has been handed in by the right-hand participant. Each participant pastes his/her three pasting tags 27 on the second sub thought unit 23B. The participants then hand in their instruments for contemplation to their left-hand participant.

The time of thinking for four minutes is given at this time, wherein each participant fills new thought results in further other three pasting tags 27, looking over the six thought results displayed on the first and second sub thought units 23A and 23B of the instrument for contemplation that has been handed in by the right-hand participant. The participants each paste their three pasting tags 27 on the three sub thought unit 23C. In this way, the nine thought results are displayed on all the thought cells of the thought unit 23, respectively.

The participants hand in their instruments for contemplation to their left-hand participants, respectively. The time of thinking for one minute is given at this time, wherein each participant select among the nine thought results that are displayed on the thought unit 23, five ones that are thought to be effective in the increase of the turnover, thus to paste the five selected pasting tags 27 on the first selecting unit 24. The participants each hand in their instruments for contemplation to the left-hand participants, respectively.

The time of thinking for thirty seconds is given at this time, wherein each participant selects among the five thought results displayed on the thought unit 24, three ones that are thought to be effective in the increase of the turnover, thereby pasting the selected pasting tags 27 on the second selecting unit 25. Thereafter, the participants hand in their instruments for contemplation to the left-hand participants, respectively. Further, the time of thinking for thirty seconds is given at this time, wherein each participant selects among the three thought results displayed on the thought unit 25, one thought result that is thought to be effective in the increase of the turnover, thus to paste the selected pasting tag 27 on the selecting unit 26, whereby the meeting is concluded.

In accordance with the above procedure, the meeting is completed in approximate fifteen to twenty minutes in total. The participants each have their instruments for contemplation, which serve as meeting documents or minute books corresponding to the number of the participants, that is, six minute books in the example. On each instrument for contemplation are displayed the thought results of three participants and the selection processes of the other participants as they are. Therefore, this enables efficient and sophisticated collection and analysis of the ideas.

In the above example, the three that is the number of the sub thought units 23A, 23B, and 23C and the three that is the number of the selecting units 24, 25, and 26 are decided in such a fashion that they are added to each other to be equivalent to the six that is the number of the participants. Thereby, holding a meeting in accordance with the above procedure enables the persons other than the persons who filled the thought results in the sub thought units 23A, 23B, or 23C, to evaluate and select the thought results displayed on the thought units 23A, 23B, and 23C. This does not allow the persons who filled in the thought results themselves to select those thought results, whereby an objective selection among the thought results is expected. Determining the number of each unit in this way and preparing the instruments for contemplation corresponding to the number of the participants of the meeting, for example, five, six, or ten persons, permits holding an effective meeting.

The numbers of the thought results displayed on the above selecting units are set in such a manner that numbers closer to the selecting unit 26 are smaller. It is because this makes it easy to screen the thought results through several selection works to select the best one. The criterion of evaluating the thought results displayed on the thought unit 23 may be, for example, a priority in importance, economy, or novelty, which is freely decided among the participants in advance.

For example, in the second embodiment, if the subject cell, the thought unit, and the selection cell are printed on one paper, the process of thought for selecting the thought results is clearly grasped, which is common among all the embodiments of the present invention. However, it is possible to print each unit on papers equal to or more than two in consideration for the size or the like of a cell and to use those papers in a set. It is also possible to use pasting tags in the first embodiment, and to fill the thought results in all the thought cells with a pencil or a pen to hold a meeting in the second embodiment.

In all the embodiments of the present invention, it is possible to use each unit by displaying it on the display or the like of a computer. In this case, units are linked with each other according to a computer program. In the first embodiment, it is desirable that the main unit and the sub unit are schematically and simultaneously displayed on a screen, wherein to write or read with respect to the thought cells of each unit, the units are by turns displayed in magnification. In the second embodiment, such a control is desirably done that the units are by turns displayed in correspondence with the progress of the meeting and the thought results selected using a mouse are copied into the selecting units.

<Third Embodiment>

Figure 5:
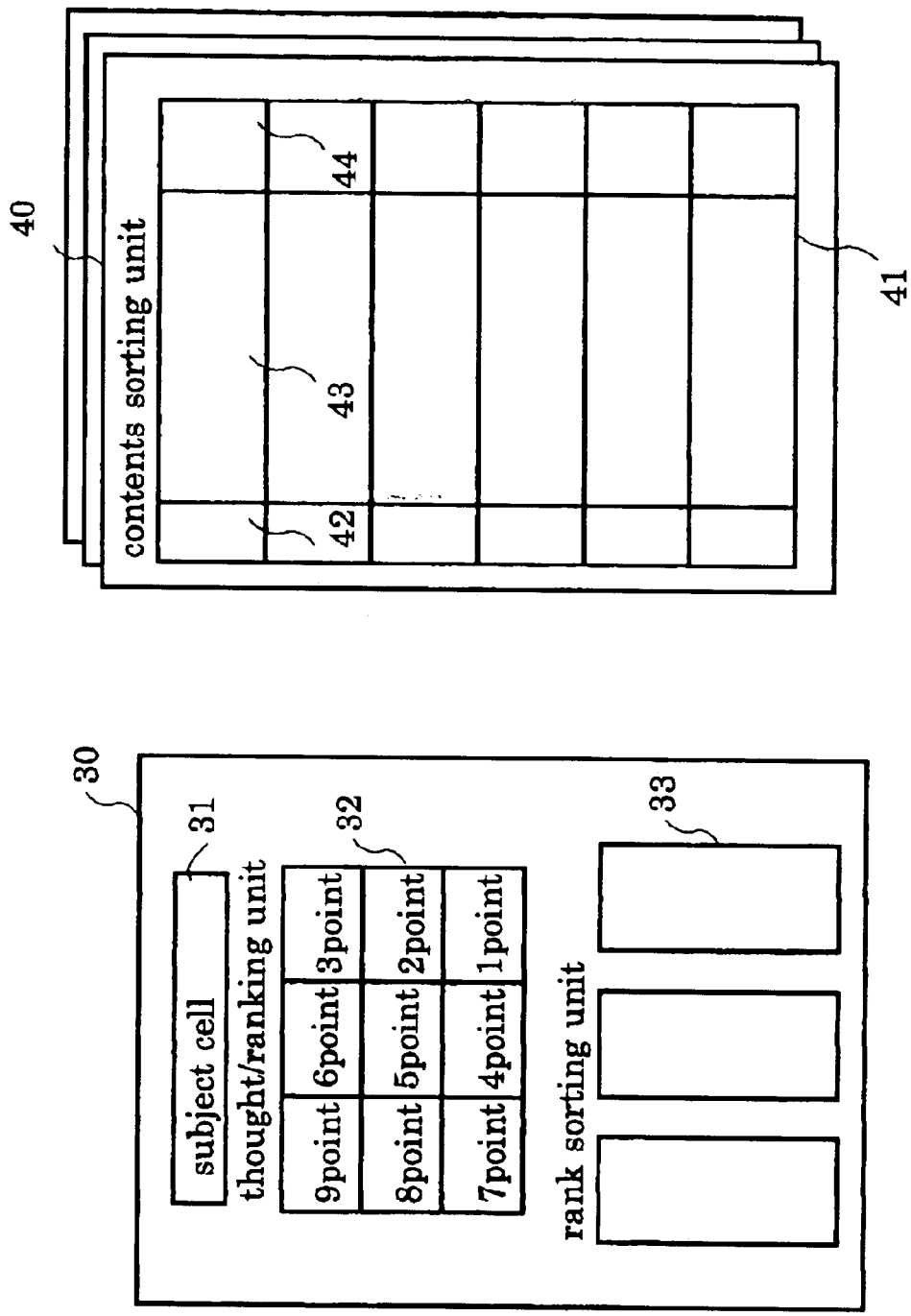
FIGS. 5(a) and (b) schematically shows the instrument for contemplation of the third embodiment.

FIG. 5 schematically shows the instrument for contemplation of the third embodiment. In this embodiment, on the paper 30 are printed the subject cell 31, the thought/ranking unit 32, and the rank sorting unit 33. Meanwhile, on the paper 40 is printed the contents sorting unit 41.

In the subject cell 31 is displayed a predetermined subject. In the thought/ranking unit 32 are displayed a plurality of thought results found from the subject. In the rank sorting unit 33 are displayed a plurality of thought results that are displayed in the thought/ranking unit 32, being classified into three ranks according to a given criterion. The criterion is not limited similar to the second embodiment. The criterion is, for example, a priority in importance, economy, or novelty, which is decided among the participants in advance. In the embodiment, classification is done in order of the upper, middle, and lower.

The thought/ranking unit 32 displays a plurality of thought results displayed on the rank sorting unit 33, the thought results being ranked according to the above criterion and sorted from the upper to the lower. In the cells of the thought/ranking unit 32 that display the thought results are displayed evaluation marks or points corresponding to the ranks of the thought results. The thought/ranking unit 32 is used twice, that is, before the ranking of the thought results and after the final ranking thereof, which will be described later.

The contents sorting unit 40 is provided with sorting cells 43 that display in a lump the thought results whose contents are similar to each other, and evaluation cells 44 that each display the total of the evaluation marks of all the thought results sorted in the same sorting cell 43. To clarify the contents of the thought results sorted in a sorting cell 43, at the left thereof is provided a sorting keyword cell 42. The contents sorting units 40 are used to sort and display in order of contents all the thought results found by the participants, wherein the contents sorting units 41 whose number corresponds to the number of the classification and the number of the pasting tags are prepared. The paper 30 and the paper 40 may be unified with each other or may be bound with each other like a book.

The instrument for contemplation above is used as following. First, the papers 30 shown in the figure are delivered to, for example, five participants of a meeting. Each participant fills the subject in the subject cell 31 and further pastes on the thought unit 32, nine pasting tags in which thought results are filled. In this case, the time of thinking for three minutes is decided and nine thought results that are found for the time of thinking are filled in the pasting tags. Alternatively, after completion of the meeting in the second embodiment, the nine thought results displayed in the thought unit 23 of FIG. 4 may be copied as they are.

In the embodiment, each participant does all the works up to the ranking of the thought results alone. Once the pasting tags in which the nine thought results are filled are pasted on the thought unit 32, another time of thinking for three minutes is given, wherein the nine thought results are sorted into the upper, middle, or lower in accordance with the predetermined criterion. The pasting tags in each rank are then pasted on the corresponding cell of the rank sorting unit 33. Further, the time of thinking for three minutes is given, wherein the three thought results in each cell of the rank sorting unit 33 are ranked according to the above criterion, whereby all the nine thought results are finally ranked from the first place to the ninth place.

In this way, the nine thought results are roughly classified into three cells, and thereafter the three thought results in each cell are ranked, whereby all the nine thought results are finally ranked from the first place to the ninth place, which is because it facilitates intuitively and quickly ranking, that is, ranking all the nine thought results simultaneously requires more time but does not always give better conclusion.

After completion of ranking the nine thought results as explained above, each participant fills the nine point in the pasting tag whose thought result is the first place. Further, to clarify the proposer, all the pasting tags are filled in the names of the proposers or signatured by the proposers. Thereafter, the papers 30 that were prepared by all the participants are collected. The pasting tags in which the thought results are filled are sorted in terms of contents, and the pasting tags whose contents are similar to each other are pasted on the same sorting cell 43. Further, the keywords that clarify the classifications are filled in the sorting keyword cells 42. The evaluation points that are filled in all the pasting tags pasted on the same sorting cell 43 are totaled and the sum is filled in the evaluation cell 44.

The meeting is concluded after the above procedure is done. It is assumed that the number of the participants is five, the subject is to increase the turnover in the next term, and the thought units 32 of all the participants includes a thought result like "to expand the floor space." A participant might rank this thought result as the first place; however, the other participants might rank that thought result as the third place. In this case, even though the same contents is filled in pasting tags, the evaluation points thereof, depending upon persons, are nine marks or seven marks. Totaling the evaluation points by sorting in the contents sorting unit 40 gives a large mark to the thought result that many participants think important but a small mark to the thought result that a few participants think important. Accordingly, a considerably objective evaluation can be made on the paper 40.

The five participants can find nine thought results common among those participants by discussing to individually sort the thought results and can discuss with each other to individually rank the nine thought results found alone. Further, concerning the same subject, a large number of participants are divided into groups each including five or six participants, wherein collecting and analyzing the contents sorting units given by discussing for each group enables considering the thought results given by all the participants. This renders the meeting effective and enables readily seeing the conclusion for use. The above instrument for contemplation is widely used for a variety of education systems, information sharing systems, and conference systems for various fields.

Figure 6:
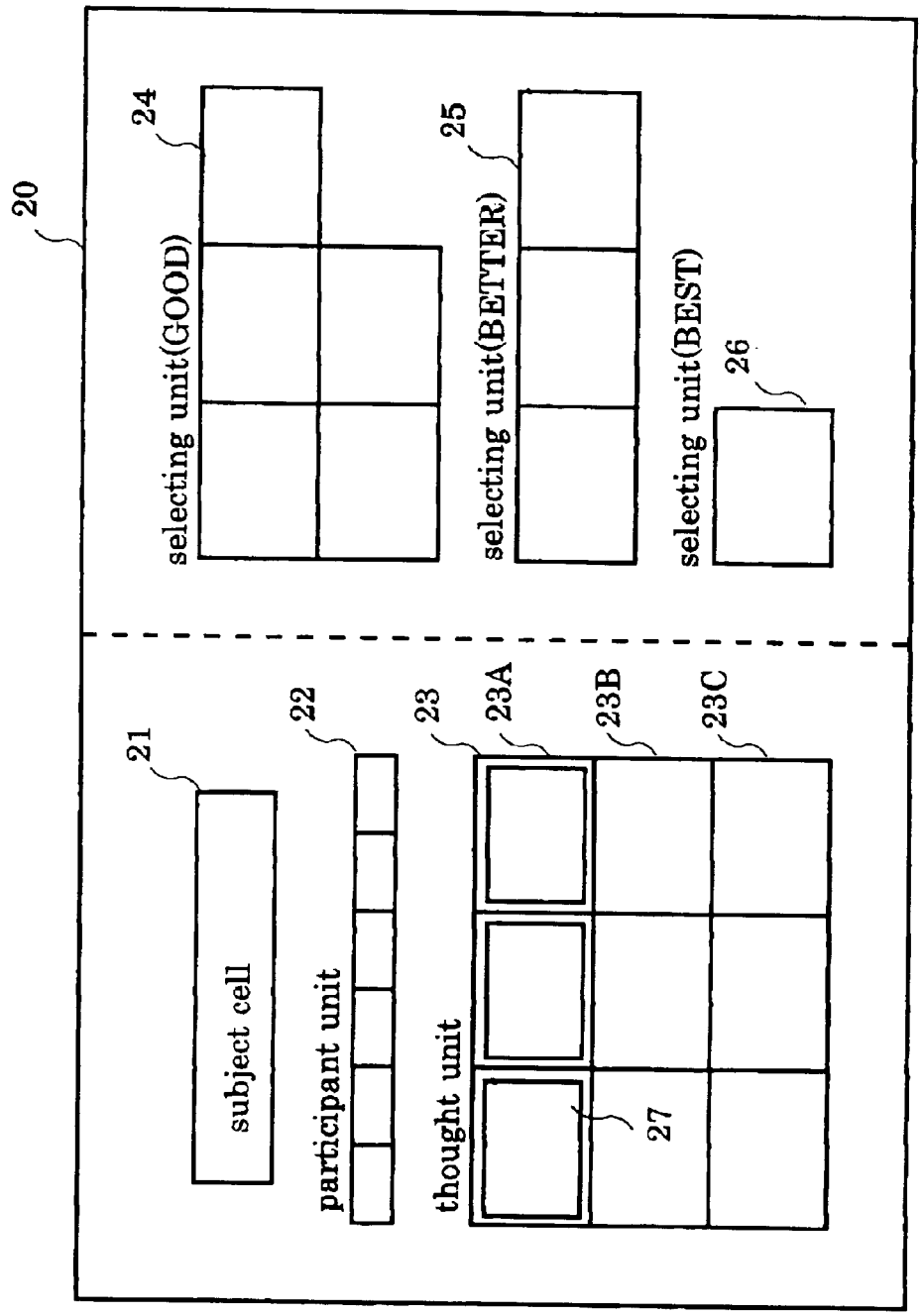
FIG. 6 schematically shows an example of the instrument for contemplation of the second embodiment.

FIG. 6 schematically shows the instrument for contemplation of the second embodiment. When the instruments are actually used in a meeting, explanatory sentences that demonstrates the participants the methods of using each unit are appropriately provided in those instruments as shown in the figure. According to the instruction given by the leader, for example, the pasting tags in which the thought results are filled are then pasted on or moved to the corresponding units for the advance of the meeting.

For the participant unit, the following explanation is provided.

Fill in the names of the participants.

Introduce yourself (Understand other participants carefully).

Fill your name in the cell 1, and fill in the names of other participants lined in your left direction in the cells 2, 3, ... and 6 by turns. Therefore, the cell 6 is filled in the name of your right-hand participant. Check the leader.

First, the discussion on the subject is held. The explanation for the discussion is as follows.

(The time required is approximately ten minutes.)

The leader should roughly discuss the subject with the participants to permit them to profoundly recognize the subject.

The participants' recognitions of the subject that are common there among enhance the level of the meeting.

The leader should provide the participants with hints as to the solution.

As a method of using the first sub thought unit, the following explanation is provided.

(The time required is approximately three minute.)

Fill in and paste three keywords or the like (approximate 12 characters) to solve the subject for three minutes.

Hand in your sheet to your left-hand person after three minutes elapses.

As the method of using the next sub thought unit, the following explanation is provided.

(The time required is approximately three minutes and thirty seconds.)

Read the contents of the tags pasted on the sheet that is hand in to you, and study other's thought results.

Fill in and paste three improved keywords or the like for solution (approximate 12 characters).

Hand in the sheet to your left-hand person after the time of three minutes and thirty seconds elapses.

As the method of using the last sub thought unit, the following explanation is provided.

(The time required is approximately four minutes.)

Read the six contents of the tags pasted on the sheet and study other's thought results in the way similar to the above.

Fill in and paste three further improved keywords or the like (approximate 12 characters).

Hand in the sheet to your left-hand person after the time of four minutes elapses.

The explanation on the first selecting unit is as following.

(The time required is approximately one minute.)

Select and paste here five good ones among the nine thought results.

Thereafter, hand in the sheet to your left-hand person.

The explanation on the second selecting unit is as following.

(The time required is approximately thirty seconds.)

Select and paste three good ones among the selected five though results.

Thereafter, hand in the sheet to your left-hand person.

The explanation on the last selecting unit is as following.

(The time required is approximately thirty seconds.)

Select and paste good one among the selected three thought results.

In this way, the meeting is concluded.

Figure 7:
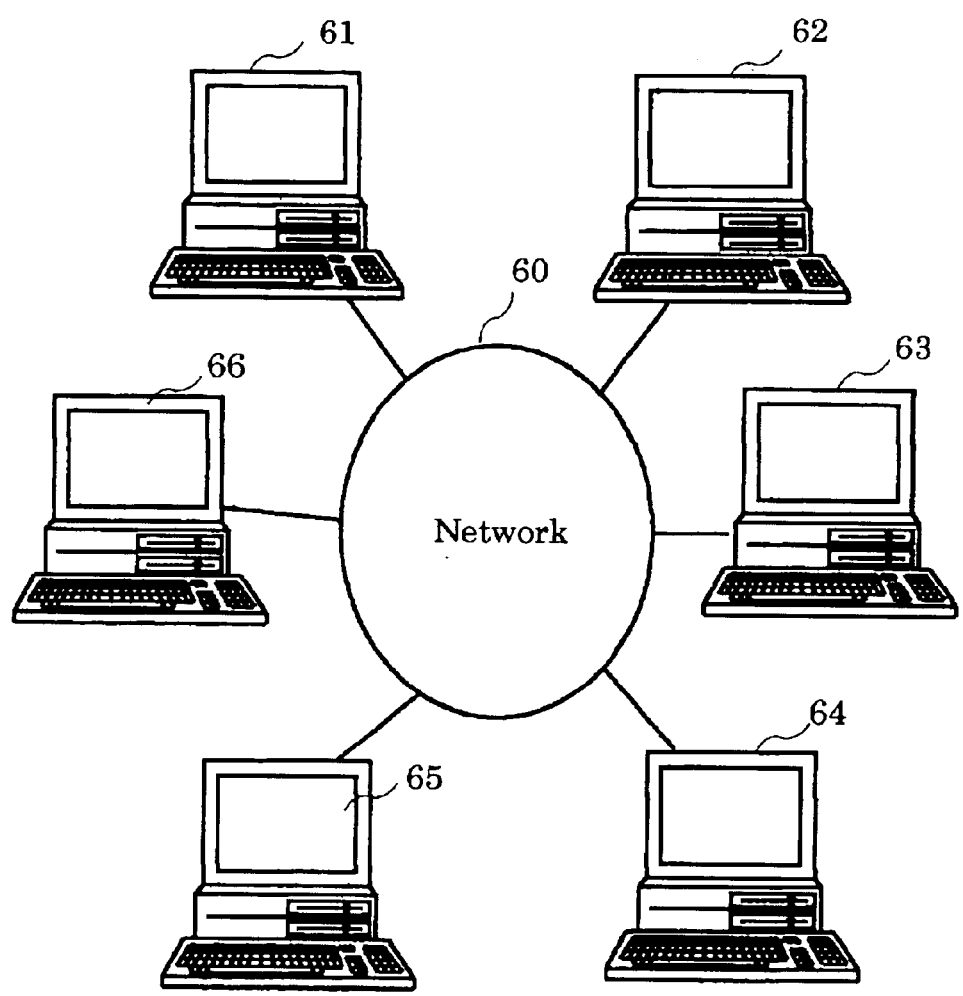
FIG. 7 is a block diagram showing the conference system using a network.

FIG. 7 is a block diagram showing a conference system that uses a network. As shown in the figure, the terminals 61–66 are connected to each other via the network 60. The network 60 may be a closed-type network or a open-type network like the internet. The meeting is held by the six participants. The terminals 61–66 are manipulated by the conference participants 70a–70f, respectively.

On all the displays of the terminals 61–66 are in turn shown the images that will be described later. Each terminal displays the same image for the same manipulation thereof. Manipulating the terminal renders electronic the instrument for contemplation used for conference of FIG. 4, which is circulated among the participants. Hereinafter, an example of manipulating the terminal 61 will be explained.

Figure 8:
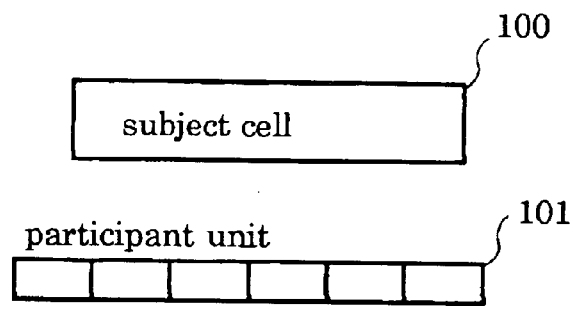
FIG. 8 shows an images corresponding to the subject cell and the participant unit.

First the images 100 and 101 shown in FIG. 8 are displayed on all the displays of the terminals 61–66. The image 100 is used for filling in the subject of the meeting. The image 100 corresponds to the subject displaying cell 21 of FIG. 4. The image 101 is used for filling in the names of all the participants. The image 101 corresponds to the participant unit 22. The subject of the meeting and the information on the participants are shared by all the participants. For example, the subject of the meeting that is inputted by the leader of the meeting is displayed on all the displays of the terminals 61–66. It is preferable that the participants fills in their names in the order of the circulation.

Figure 9:
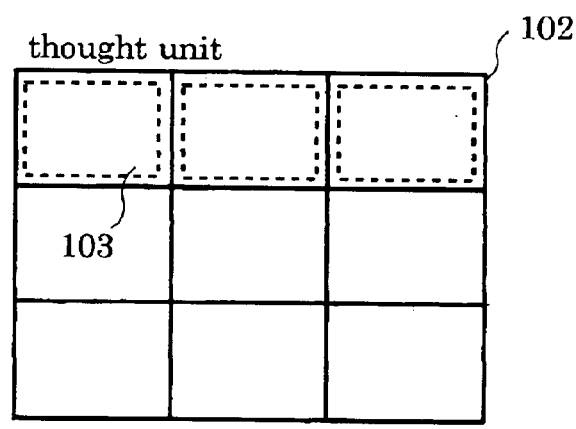
FIG. 9 shows an image corresponding to the thought unit.

Upon commencement of the meeting, the image 102 of FIG. 9 is displayed on the display of the terminal 61. The image 102 corresponds to the thought unit 23 of FIG. 4. The participants thinks, for example, for three minutes and then fills three ideas in the cells 103 indicated by the broken lines.

The data that has been filled in the cell 103 is moved to another cell by drag & drop. The image 102 that the three ideas are in the cells 103 indicated by the broken lines is forwarded to the next terminal or participant.

That is, the image prepared at the terminal 61 is forwarded to the terminal 62. The image prepared at the terminal 62 is forwarded to the terminal 63. The image prepared at the terminal 63 is forwarded to the terminal 64. The image prepared at the terminal 64 is forwarded to the terminal 65. The image prepared at the terminal 65 is forwarded to the terminal 66. The image prepared at the terminal 66 is forwarded to the terminal 61.

Figure 10:
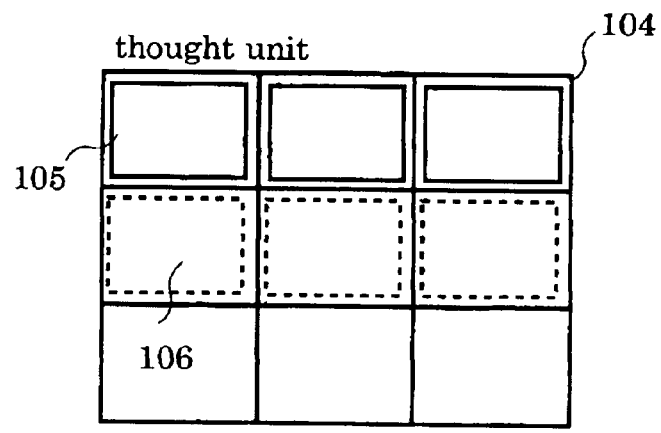
FIG. 10 shows another image corresponding to the thought unit.

FIG. 10 shows the image that is shown on the display of the terminal 61 after the forwarding from the terminal 66 to the terminal 61. The three ideas that have been filled in at the terminal 66 are shown in the cells 105 indicated by the solid lines. Next, the three ideas displayed in the cells 105 indicated by the solid lines are referred to and other three ideas are filled in the cells 106 indicated by the broken lines. Thereafter, the inputted data are forwarded to the following terminal or participant.

Next, the image 107 shown in FIG. 12 is displayed on all the terminals 61–66. In the cells 108 indicated by the solid lines are ideas that have been inputted during circulation among the participants. Referring to the ideas displayed in the cells 105 indicated by the broken lines and the cells 109 indicated by the solid lines, each of the participants 70a–70f fills further other three ideas in the cells 109 indicated by the broken lines. Consequently, the nine ideas are filled in the cells 107 in total, thus being forwarded to the following participant.

FIG. 11 shows the image 107 that is forwarded from the terminal 66 to the terminal 61 at the next timing. The six ideas that have been filled in at the terminals 65 and 66 are shown in the cells 108 indicated by the solid lines. Next, the ideas in the cells 108 indicated by the solid line are referred to and three new ideas are then filled in the cells 109 indicated by the broken line. Thereafter, the inputted data is forwarded to the following participant.

After repetition of the same process, the image that is given the nine ideas in total is displayed on the terminal 61. Here, five ideas that appear GOOD are selected from the nine ideas. FIG. 12 shows the image displayed in this selection. The five ideas among the nine ideas that have been filled in the nine cells of the image 123 are moved to the image 124 by drag & drop. The image 124 is corresponds to the selection unit of FIG. 4. The figure shows the state that such a movement is completed. The result of the selection is forwarded to the following participant.

FIG. 13 shows the image that is forwarded from the terminal 66 to the terminal 61 at the next timing. The five ideas that have been selected at the terminal 66 are displayed in the image 124. Three ideas that appear BETTER are then selected among those five ideas. The three ideas among the five ideas that have been filled in the five cells of the image 124 are moved to the image 125 by drag & drop. The image 125 corresponds to the selecting unit 25. The figure shows the state that the movement is completed. The result of the selection is forwarded to the following participant.

FIG. 14 shows the image that is forwarded from the terminal 66 to the terminal 61 at the next timing. The three ideas that have been selected at the terminal 66 are displayed in the image 125. One idea that appears BEST among those three ideas is then selected. The idea selected among the three ideas that have been filled in the three cells of the image 125 is moved into the image 126 by drag & drop. The image 126 corresponds to the selecting unit 26. In this way, the meeting is completed.

Figure 15:
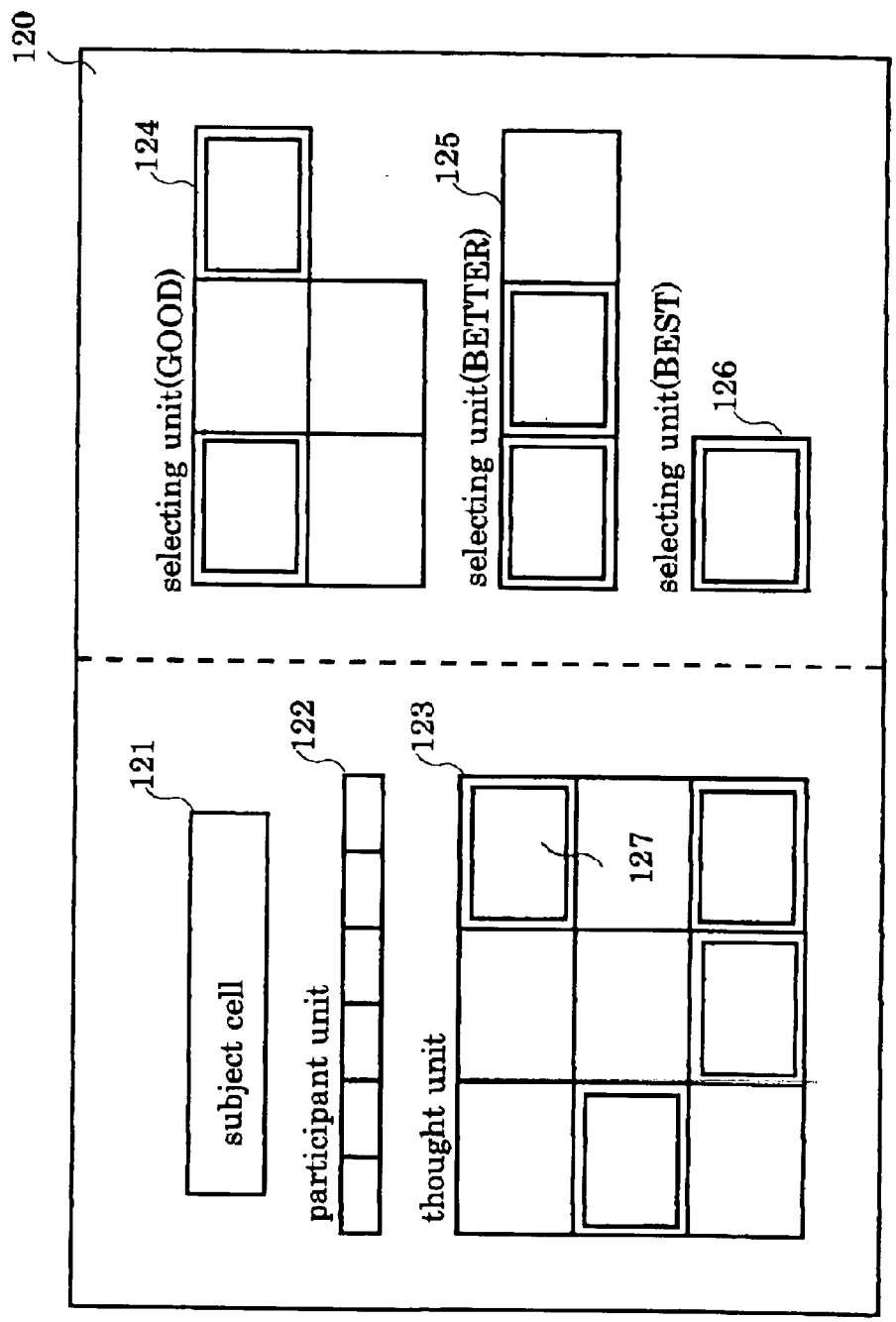
FIG. 15 shows an image corresponding to the instrument for contemplation.

Holding the meeting by the six participants prepares the six data each including the contents shown in FIG. 15. This has a function similar to that of the instrument for contemplation of FIG. 4. The leader of the meeting collects those data to arrange the result of the meeting. The forwarding or circulating among the terminals is carried out by emailing the data corresponding to the sheet of FIG. 15, for example. The forwarding may be carried out by using one of the terminals as a server and storing therein the data corresponding to the six sheets. Each participant reads the data of each sheet in the order of the circulation to input data thereto. In any case, according to the present invention, a participant at a remote place can submit an idea, which enables advancing a silent meeting quickly and efficiently.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An instrument for contemplation comprising:
   a first computer terminal comprising memory;
   a medium capable of displaying words; and
   software executable on the first computer terminal for:
   receiving a subject of a meeting;
   providing a subject displaying cell on the medium, the subject displaying cell displaying the subject of the meeting;
   receiving a plurality of thought results found from the subject by a first participant of the meeting;
   storing the plurality of thought results found from the subject by the first participant of the meeting in the memory as first thought results;
   retrieving the first thought results from in the memory;
   providing a first thought unit on the medium, the first thought unit including a plurality of thought result displaying cells that display the first thought results retrieved from the memory;
   receiving a plurality of thought results found from the subject and the first thought results by a second participant of the meeting;
   storing the plurality of thought results found from the subject and the first thought results by the second participant of the meeting in the memory as second thought results;
   retrieving the second thought results from the memory;
   providing a second thought unit on the medium, the second thought unit including a plurality of thought result displaying cells that display the second thought results retrieved from the memory;
   allowing a third participant of the meeting to select thought results among the thought results displayed in the first and second thought units;
   providing an upper selecting unit on the medium, the upper selecting unit including a plurality of thought result displaying cells that display a predetermined number of thought results selected among the thought results displayed in the first and second thought units by the third participant of the meeting;
   allowing a fourth participant of the meeting to select thought results among the thought results displayed in the upper selecting unit;
   providing a lower selecting unit on the medium, the lower selecting unit including a plurality of thought result displaying cells that display a predetermined number of thought results selected among the thought results displayed in the upper selecting unit by the fourth participant of the meeting; and
   wherein the thought results are selected from the group consisting of solutions to solve the subject, actions to be taken to accomplish the subject and keywords associated to the subject.

2. The instrument for contemplation as set forth in claim 1, wherein, the number of thought units and the number of selecting units are decided in such a fashion that the number of thought units and the number of selecting units are added to each other to be equivalent to the number of members of the meeting.

3. The instrument for contemplation as set forth in claim 1, wherein the medium is a display of the first computer terminal.

4. The instrument for contemplation as set forth in claim 1, wherein two or more thought units are provided on the medium; and two or more lower selecting units are provided on the medium.

5. The instrument for contemplation as set forth in claim 1, further comprising:
   a second computer terminal comprising memory, the second computer terminal connected to the first computer terminal via a network,
   wherein at least one of the first participant, the second participant, the third participant, and the fourth participant is using the second computer terminal, and
   wherein data received by one of the first computer terminal and the second terminal is forwarded to the other of the first computer terminal and the second computer terminal via the network.

6. The instrument for contemplation as set forth in claim 5, wherein the network is an open-type internet.

7. The instrument for contemplation as set forth in claim 5, wherein the data forwarded via the network is forwarded via email.

8. The instrument for contemplation as set forth in claim 1, wherein the software executable on the computer terminal allows thought results to be selected by drag & drop.

9. The instrument for contemplation as set forth in claim 5, wherein the second computer terminal is in a remote location from the first computer terminal.

10. The instrument for contemplation as set forth in claim 5, further comprising:
    a server connected to the first terminal computer and the second terminal computer, wherein the first terminal computer and the second terminal computer store received data on the server and retrieve stored data from the server.

11. The instrument for contemplation as set forth in claim 1, further comprising:
    a second computer terminal comprising memory;
    a third computer terminal comprising memory; and a fourth computer terminal comprising memory;

wherein the first computer terminal, the second computer terminal, the third computer terminal, and the fourth computer terminal are connected to each other via a network, wherein each of the first participant, the second participant, the third participant, and the fourth participant are each respectively using the first computer terminal, the second computer terminal, the third computer terminal, and the fourth computer terminal, and wherein data received by one of the first computer terminal, the second computer terminal, the third computer terminal, and the fourth computer terminal is forwarded to another of the first computer terminal, the second computer terminal, the third computer terminal, and the fourth computer terminal via the network.

12. An instrument for contemplation comprising:

a first computer terminal comprising memory;

a medium capable of displaying words; and software executable on the first computer terminal for:

receiving a subject of a meeting;

providing a subject displaying cell on the medium, the subject displaying cell displaying the subject of the meeting;

receiving a plurality of thought results found from the subject by a first participant of the meeting;

storing the plurality of thought results found from the subject by the first participant of the meeting in the memory as first thought results;

retrieving the first thought results from in the memory;

providing a first thought unit on the medium, the first thought unit including a plurality of thought result displaying cells that display the first thought results found retrieved from the memory;

receiving a plurality of thought results found from the subject and the first thought results by a second participant of the meeting;

storing the plurality of thought results found from the subject and the first thought results by the second participant of the meeting in the memory as second thought results;

retrieving the second thought results from the memory;

providing a second thought unit that is provided on the medium, the second thought unit including a plurality of thought result displaying cells that display the second thought results retrieved from the memory;

providing a rank sorting unit on the medium, the rank sorting unit displaying the plurality of thought results, and allowing the plurality of thought results to be ranked according to a given criterion and sorted according to the ranks thereof;

providing a ranking unit on the medium, the ranking unit displaying the plurality of thought results displayed on the rank sorting unit, the plurality of thought results being ranked according to the criterion and sorted from the upper to the lower;

providing a contents sorting unit on the medium, the contents sorting unit displaying the plurality of thought results that have been ranked, the plurality of thought results being sorted by contents, wherein the rank sorting unit includes a plurality of cells that display the plurality of thought results and are given evaluation marks corresponding to the ranks thereof, and the contents sorting unit includes a totaling cell that displays the plurality of thought results that are given the evaluation marks prepared by the participants in such a fashion that the plurality of thought results are sorted by contents, and that displays the total of the evaluation marks corresponding to a plurality of thought results sorted in a same classification; and wherein the thought results are selected from the group consisting of solutions to solve the subject, actions to be taken to accomplish the subject and keywords associated to the subject.

13. An instrument for contemplation as set forth in claim 12, wherein the medium is a display of the first computer terminal.

14. The instrument for contemplation as set forth in claim 12, further comprising:

a second computer terminal comprising memory, the second computer terminal connected to the first computer terminal via a network, wherein at least one of the first participant, the second participant, the third participant, and the fourth participant is using the second computer terminal, and wherein data received by one of the first computer terminal and the second terminal is forwarded to the other of the first computer terminal and the second computer terminal via the network.

15. The instrument for contemplation as set forth in claim 14, wherein the network is an open-type internet.

16. The instrument for contemplation as set forth in claim 14, wherein the data forwarded via the network is forwarded via email.

17. The instrument for contemplation as set forth in claim 14, wherein the second computer terminal is in a remote location from the first computer terminal.

18. The instrument for contemplation as set forth in claim 14, further comprising:

a server connected to the first terminal computer and the second terminal computer, wherein the first terminal computer and the second terminal computer store received data on the server and retrieve stored data from the server.

19. The instrument for contemplation as set forth in claim 12, wherein the software executable on the computer terminal allows thought results to be selected by drag & drop.

20. The instrument for contemplation as set forth in claim 14, further comprising:

a second computer terminal comprising memory;

a third computer terminal comprising memory; and a fourth computer terminal comprising memory;

wherein the first computer terminal, the second computer terminal, the third computer terminal, and the fourth computer terminal are connected to each other via a network, wherein each of the first participant, the second participant, the third participant, and the fourth participant are each respectively using the first computer terminal, the second computer terminal, the third computer terminal, and the fourth computer terminal, and wherein data received by one of the first computer terminal, the second computer terminal, the third computer terminal, and the fourth computer terminal is forwarded to another of the first computer terminal, the second computer terminal, the third computer terminal, and the fourth computer terminal via the network.

* * * * *